United States Patent
Fromyer et al.

(10) Patent No.: US 7,094,157 B2
(45) Date of Patent: Aug. 22, 2006

(54) AMUSEMENT RIDE VEHICLE WITH PNEUMATICALLY ACTUATED CABIN AND MOTION BASE

(75) Inventors: Stephen F. Fromyer, Silver Spring, MD (US); Samuel T. Foster, Baltimore, MD (US); Eric A. King, Westminster, MD (US); Clifford A. Jennings, Highland, MD (US); Brian M. Welsh, Sykesville, MD (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 10/781,126

(22) Filed: Feb. 18, 2004

(65) Prior Publication Data
US 2005/0048446 A1 Mar. 3, 2005

Related U.S. Application Data

(60) Provisional application No. 60/489,267, filed on Jul. 22, 2003.

(51) Int. Cl.
*A31G 31/16* (2006.01)

(52) U.S. Cl. .......................... 472/59; 472/130; 434/55
(58) Field of Classification Search .............. 472/59–61, 472/130; 434/29, 55; 104/53, 85
See application file for complete search history.

(56) References Cited

U.S. PATENT DOCUMENTS

| | | | | |
|---|---|---|---|---|
| 5,009,412 A | * | 4/1991 | Roodenburg et al. | 472/59 |
| 5,605,462 A | * | 2/1997 | Denne | 434/55 |
| 5,623,878 A | * | 4/1997 | Baxter et al. | 104/85 |
| 5,662,523 A | * | 9/1997 | Yasumaru et al. | 463/30 |
| 5,711,670 A | * | 1/1998 | Barr | 434/55 |
| 5,752,834 A | * | 5/1998 | Ling | 434/58 |
| 6,095,926 A | * | 8/2000 | Hettema et al. | 472/59 |
| 6,431,872 B1 | * | 8/2002 | Shiraishi et al. | 434/69 |
| 6,431,989 B1 | * | 8/2002 | Katayama et al. | 472/60 |
| 6,533,670 B1 | * | 3/2003 | Drobnis | 472/60 |
| 6,619,907 B1 | * | 9/2003 | Pajot | 414/795.2 |

* cited by examiner

*Primary Examiner*—Kien Nguyen
(74) *Attorney, Agent, or Firm*—Duane Morris LLP (57) ABSTRACT

A pneumatic motion platform is disclosed, adapted to allow an open center to handle shear stress without the need for a central support. In an embodiment, the platform comprises a deck; a base; a plurality of inflatable actuators, each actuator attached to the deck at a predetermined location intermediate the base and the deck, the plurality of inflatable actuators adapted for use as an active motive force with respect to the deck in a plurality of planes; a plurality of compliant stabilizers disposed intermediate the deck and the base, at least one portion of each stabilizer disposed proximate a predetermined one of the plurality of inflatable actuators; a fluid controller in fluid communication with the plurality of inflatable actuators; and a source of fluid in fluid communication with the fluid controller. A ride vehicle may comprise a cabin attached to a deck attached to the motion platform attached to a rotator such as a turntable. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

25 Claims, 9 Drawing Sheets

AMUSEMENT RIDE VEHICLE WITH PNEUMATICALLY ACTUATED CABIN AND MOTION BASE

RELATION TO PRIOR APPLICATIONS

This application claims priority through U.S. Provisional Application 60/489,267, filed Jul. 22, 2003.

FIELD OF INVENTION

The present invention relates generally to the field of motion simulators. More specifically, the present invention discloses a motion base, vehicle using the motion base, and system using the vehicle such as appropriate for use in simulators and amusement rides.

BACKGROUND OF THE INVENTION

Amusement ride vehicles are increasingly called upon to impart a sense of "being there" to amusement ride guests. Similarly, simulators in general, which may be used to impart a sense of spatial reality to the occupant, attempt to convey a sense of experiencing that which is being projected or otherwise simulated.

One method by which the illusion or simulation of being in such space may be implemented is to seat one or more individuals in a seat which is part of a platform that has controllable motion in at least two planes. Controllable motion in three planes is preferable.

In certain situations, the platform may be moved in space, e.g. along a track, while motion is imparted in X, Y, and/or Z axes, i.e. roll, pitch, heave, and yaw.

BRIEF DESCRIPTION OF AN EMBODIMENT OF THE INVENTION

Figure 1:
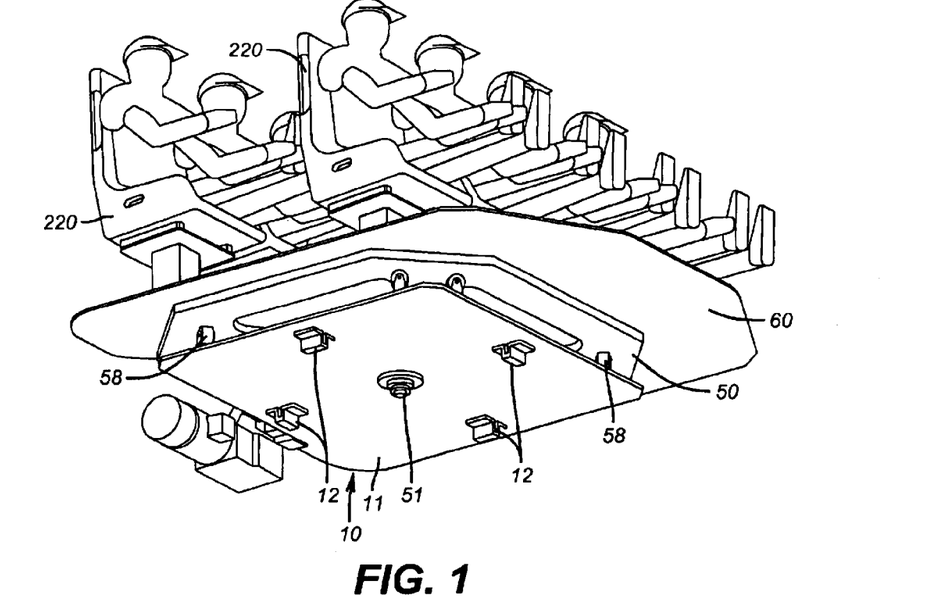
FIG. 1 is a view in partial perspective of an embodiment illustrating a motion platform, rotator, and deck.
Figure 11A:
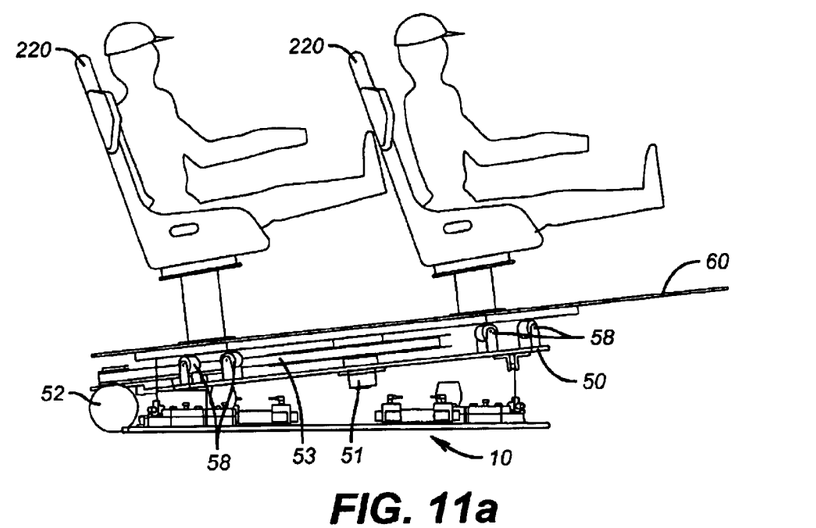
FIG. 11a and FIG. 11b are views in partial perspective and cutaway illustrating a portion of the cabin displaced in a plane in separate embodiments of the present invention.
Figure 11B:
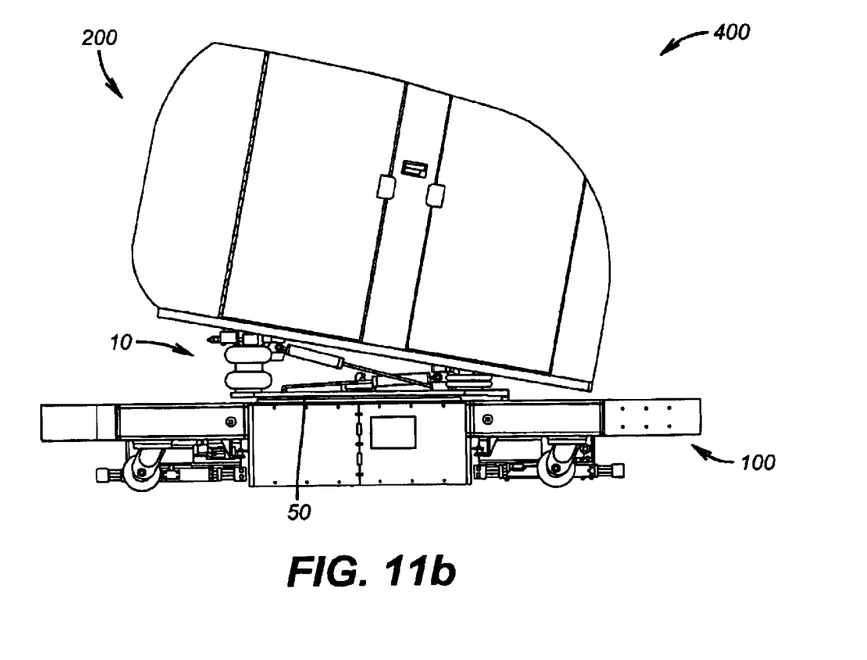
Figure 12A:
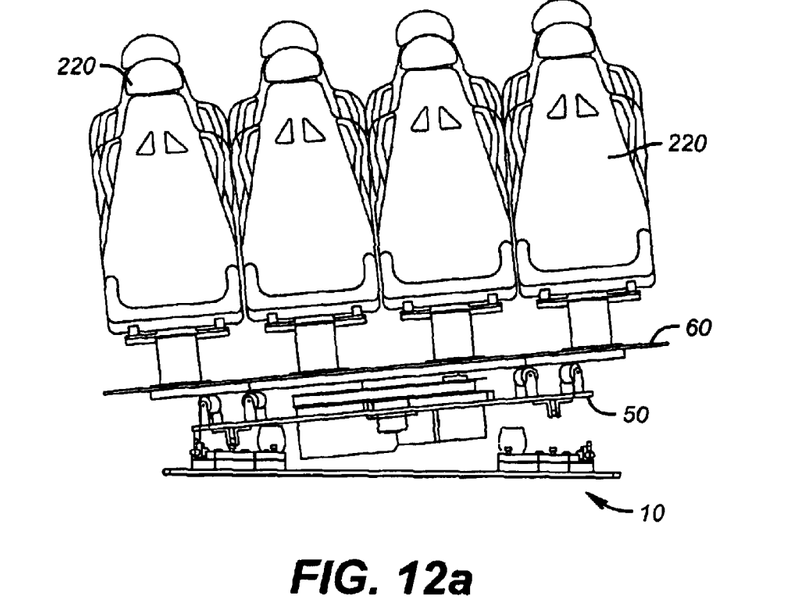
FIG. 12a and FIG. 12b are views in partial perspective and cutaway illustrating a portion of the cabin displaced in a plane in separate embodiments of the present invention.
Figure 12B:
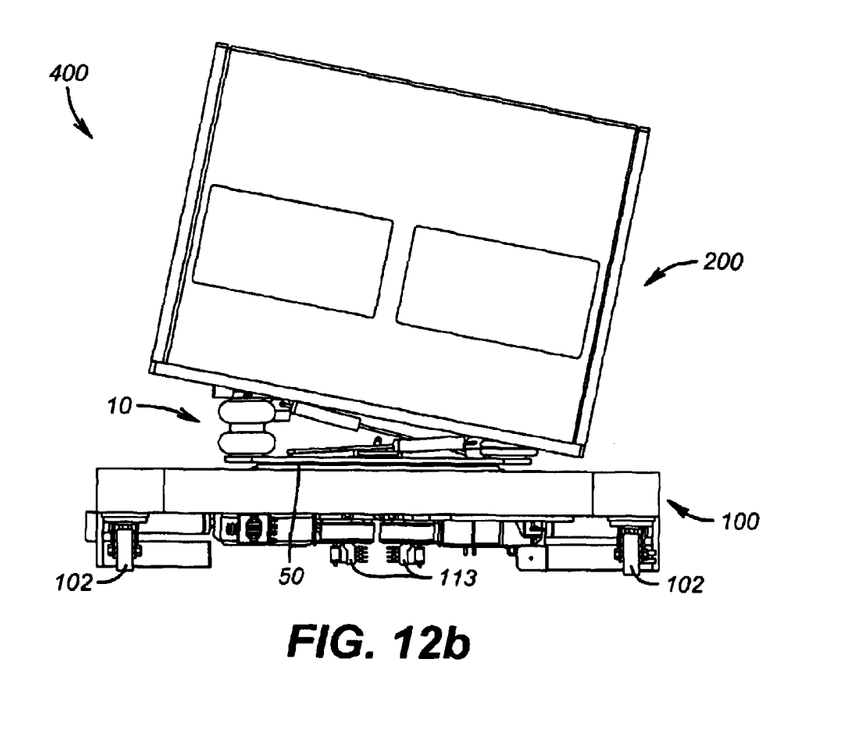

Referring now to FIG. 1, in an embodiment pneumatic motion platform 10 comprises deck 60, base 11, inflatable actuators 20 (FIG. 2), each inflatable actuator 20 adapted to be attachable to either deck 60 or base 11 at a predetermined location intermediate base 11 and deck 60, compliant stabilizers 30 (FIG. 2) disposed intermediate deck 60 and base 11; fluid controller (not shown in the figures) in fluid communication with inflatable actuators 20; and a source of fluid (not shown in the figures) in fluid communication with the fluid controller. As discussed herein below, alternate embodiments are envisioned which do not depart from the inventions claimed herein. For example, in certain embodiments, e.g. FIG. 11b, deck 60 is attached to motion base 10 which is then attached to rotatable member 50. In other embodiments, e.g. as illustrated in FIG. 1, deck 60 is attached to rotatable member 50 which is then attached to motion base 10.

Figure 6:
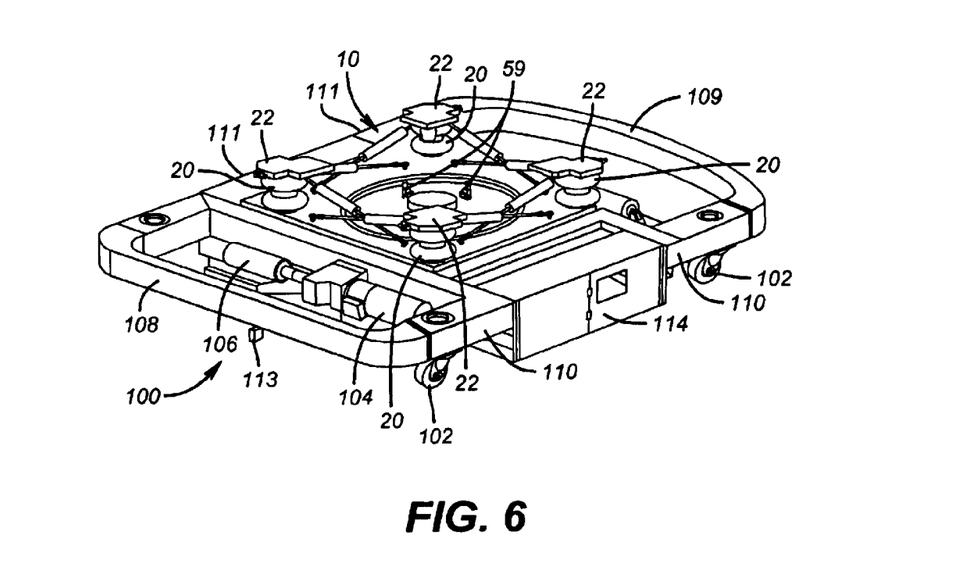
FIG. 6 is a view in partial perspective of a motion base and vehicle chassis.

Fasteners 12 may be present, either on pneumatic motion platform 10 or rotatable member 50 or both to aid in attaching an assembly comprising deck 60, motion base 10, and rotatable member 50 to another structure, e.g. frame 100 (FIG. 6). Bearings 58 may be present as more fully described herein below. Additionally, bearing 51 may be present as more fully described herein below.

Figure 2:
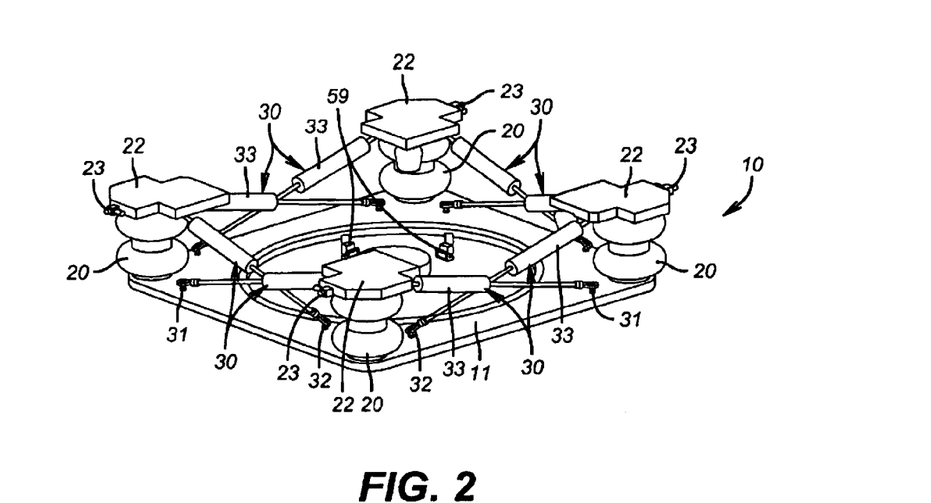
FIG. 2 is a partial perspective view of an embodiment illustrating inflatable actuators disposed on a base with stabilizers.

Referring now to FIG. 2, inflatable actuators 20 are adapted for use as an active motive force with respect to deck 60 in a plurality of planes, e.g. those defined by X-Y-Z axis through a center of deck 60. In a preferred embodiment, inflatable actuators 20 comprise flexible air spring actuators such as Model 20-2 manufactured by Firestone Corporation of Nashville, Tenn. One or more dedicated and electrically operated valves (not shown in the figures) may be present and adapted to control inflatable actuators 20.

In a preferred embodiment, deck 60 (FIG. 1) is substantially rectilinear although many shapes may be used without deviating from the invention. At least one inflatable actuator 20 may be disposed proximate each corner of the substantially rectilinear deck 60 or at some edge of deck 60 and/or base 11 in a predetermined configuration. For example, if deck 60 were substantially round or obround, inflatable actuators 20 may be disposed proximate a outer boundary of deck 60. Deck 60 may be a high strength-to-weight ratio deck, e.g. deck 60 may further comprise an aluminum skin and honeycomb materials.

Inflatable actuators 20 may be controlled by regulating the pressure within them to make them extend and retract, e.g. air pressure. A fluid controller (not shown in the figures) may be used to aid in the extension and retraction and may further comprise a fluid conduit (not shown in the figures) and a valve (not shown in the figures) disposed intermediate the fluid conduit and inflatable actuators 20. The valve may further be adapted to operate electrically, hydraulically, pneumatically, or the like, or a combination thereof. In a preferred embodiment, one or more pneumatic valves are used, i.e. proportional pressure regulators, for each inflatable actuator 20. Swivel 23 may be present to accept a fluid conduit.

A source of fluid (not shown in the figures) may be a source of gas, e.g. an on-board air supply system. In a preferred embodiment, a fluid controller (not shown in the figures) further comprises an independent pneumatic actuator controller for each inflatable actuator 20. The fluid controller may be a programmable fluid controller, e.g. a Compact Logix PLC from Allen Bradley, Corp. of Milwaukee, Wis.

The source of fluid further may further comprise an air compressor, an air accumulator (storage) tank, an air proportional valve, and an air exhaust silencer.

In the configuration illustrated in FIG. 2, rotatable member 50 (FIG. 1) is to be attached to a platform, e.g. frame 100 (FIG. 6) and to pneumatic motion platform 10, e.g. base 11. Pneumatic motion platform 10 may further be attached to deck 60 (FIG. 1) such as by mounting to adapter plates 22. In this configuration, rotatable member 50, pneumatic motion platform 10, and deck 60 may move in tandem. In other configurations, e.g. FIG. 1, rotatable member 50 and deck 60 may move in tandem without a concurrent movement of pneumatic motion platform 10.

Each adapter plate 22 may be adapted for further connections, e.g. to deck 60, and may be connected to an inflatable actuator 20. Adapter plate 22 may further act as a manifold for fluids entering inflatable actuator 20. In a preferred embodiment of this configuration, each adapter plate 22 is connected to a single inflatable actuator 20.

Further, in this configuration, limiters 59 may be present to aid in controlling motion in one or more planes.

At least one portion of each compliant stabilizer 30 may be disposed proximate a predetermined inflatable actuator 20. In a presently preferred embodiment, compliant stabilizer 30 further comprises compliant tie rod tensioner 30 adapted to provide lateral retention of deck 60 and help limit lateral, transverse, and/or rotational shear forces. Compliant tension rod 30, as will be familiar to those of ordinary skill in the art, is non-rigid and may further be adapted to take torque and shear loads, e.g. allowing inflatable actuators 20 to individually impart vertical motion with respect to deck 60.

First end 32 of compliant tie rod tensioner 30 may be attached to base 11 and second end 31 of compliant tie rod tensioner 30 may be attached to deck 60. At least one of the ends 31,32 is disposed proximate a predetermined inflatable actuator 20.

In other embodiments, stabilizer 30 may further comprise a U-joint (not shown in the figures).

Figure 3:
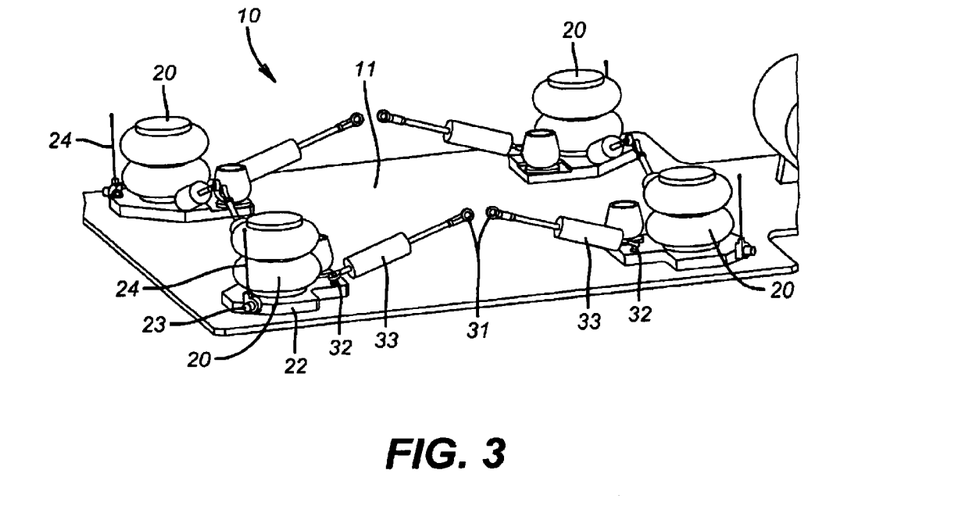
FIG. 3 is an alternate view of a further embodiment illustrating inflatable actuators disposed on a base with stabilizers.

FIG. 3 illustrates an alternative configuration in which pneumatic motion platform 10 is to be attached to rotatable member 50 (FIG. 1) which is attached to deck 60 (FIG. 1). In this configuration, adapter plates 22 may be connected to base 11. In this configuration, pneumatic motion platform 10 may remain stationary relative to deck 60 and rotatable member 50 which will move in tandem.

Figure 4:
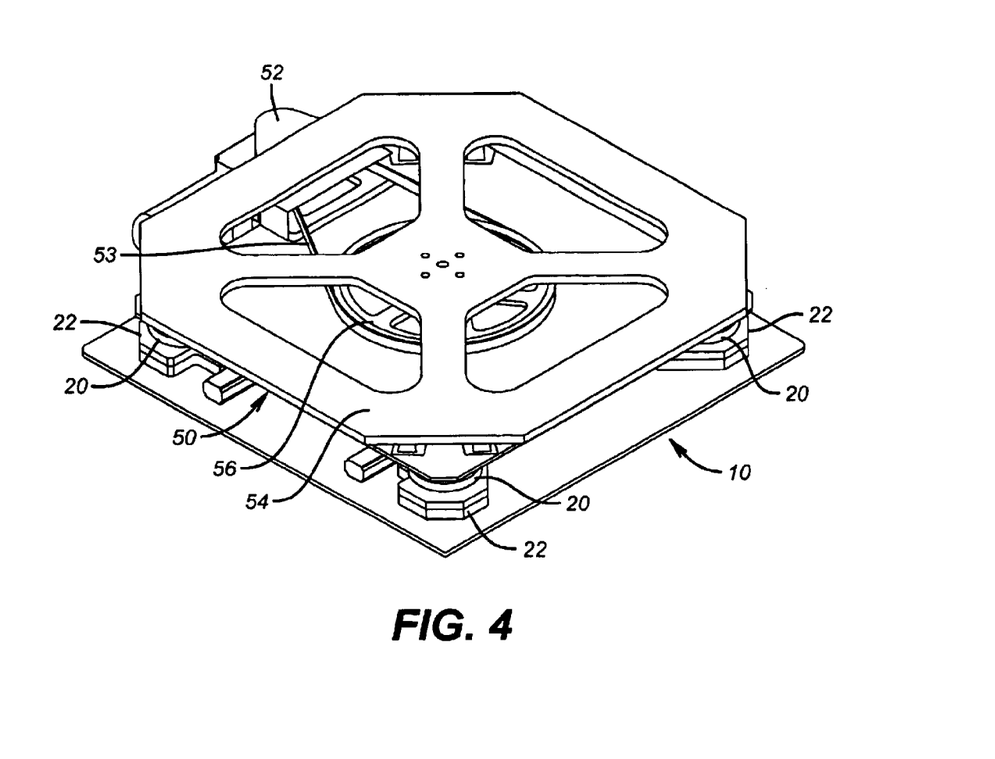
FIG. 4 is a view in partial perspective of a rotator disposed a distance from a motion base and separated from the motion base by inflatable actuators.
Figure 5:
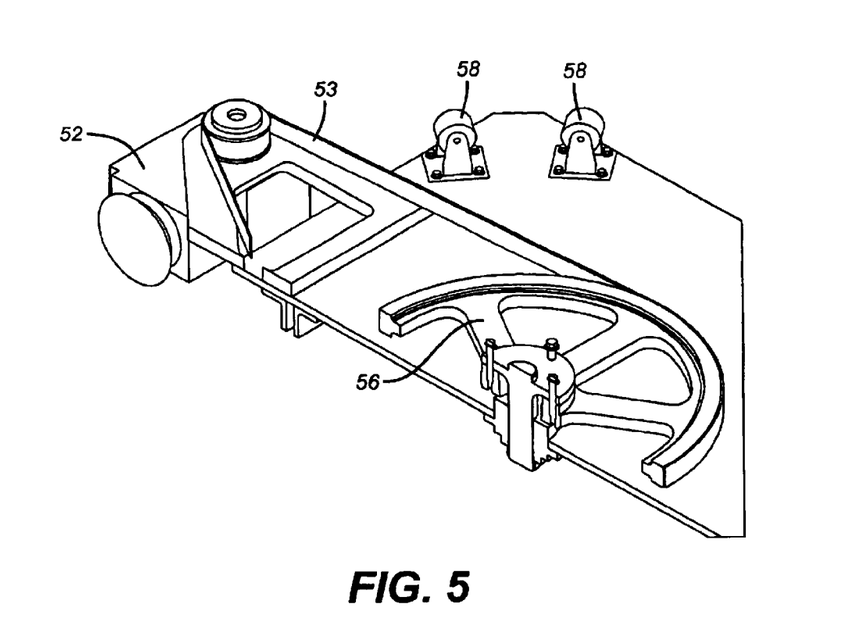
FIG. 5 is a view in partial perspective and partial cutaway illustrating caster bearings and a drive mechanism for the rotator.

Referring now to FIG. 4 and FIG. 5, rotator 50, e.g. illustrated as a turntable assembly 50, may be present and adapted to provide continuous rotation in a clockwise direction relative to a plane defined by deck 60 and/or pneumatic motion platform 10, a counterclockwise direction relative to the plane, or both (but obviously in only one direction at a time). Turntable platform 54 may be attached to deck 60 or to another structure, e.g. frame 100 (FIG. 6). Turntable assembly 50 may be rotatably mounted on a side of deck 60 opposite from a side of deck 60 to which inflatable actuators 20 are attached. Additionally, turntable platform 54 may be attached to pneumatic motion platform 10 such as via adapters 22 (FIG. 2).

Turntable controller 59 (not shown in the figures) may be present and adapted to control rotation of turntable 59, e.g. a turntable controller 59 may be a programmable controller. Rotational motor 52 may be used, e.g. connected to a drive mechanism such as belt drive 53 and drive wheel 56, although other drive mechanisms may be used, e.g. worm drives, direct drives, and the like.

Bearing 58 (FIG. 5) may disposed intermediate deck 60 and turntable 50. As illustrated in FIG. 5, bearing 58 may comprise one or more swivel casters 58.

Figure 7:
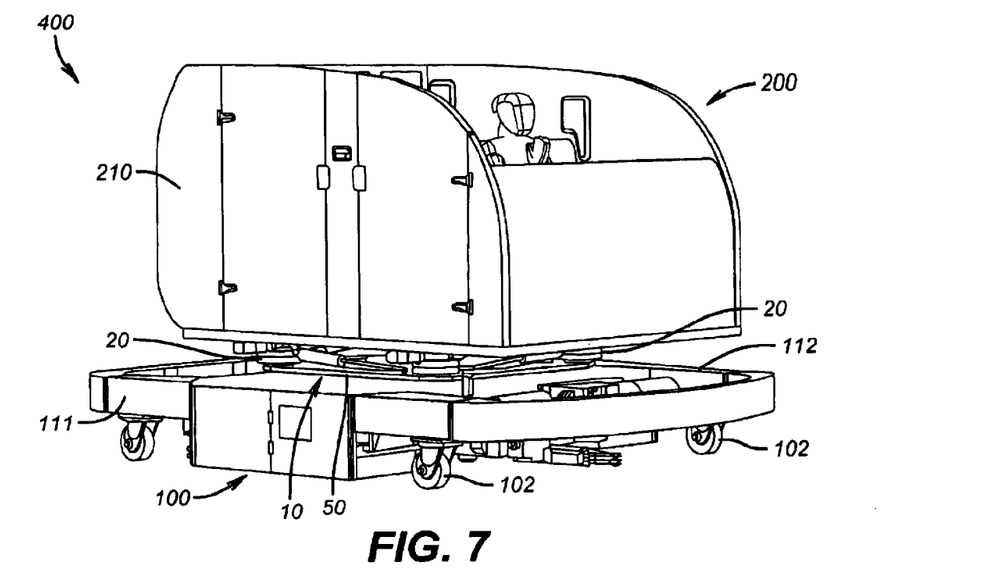
FIG. 7 is a view in partial perspective of an amusement ride vehicle illustrating a further embodiment in which a cabin is connected to the motion base, the motion base connected to a rotator, and the rotator connected to the vehicle chassis.
Figure 13:
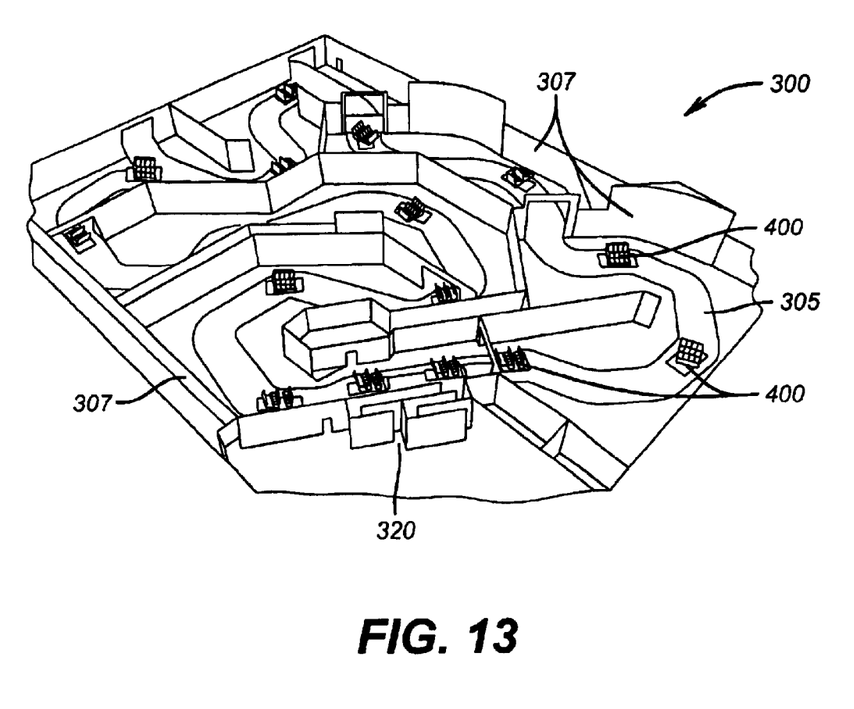
FIG. 13 is a view in partial perspective and cutaway illustrating an amusement ride systems.

Referring now to FIG. 6, frame 100 may be of uniframe or multiple component frame construction adapted to mate with or otherwise support pneumatic motion platform 10, e.g. frame 100 may comprise chassis 111 and 112 and bumpers 108 and 109. A motive system, e.g. one or more motors 104 connected to wheels 102, may be attached to pneumatic motion base 10, frame 100, or both. Such a motive system may not be necessary when pneumatic motion platform 10 is used for simulations, but may be useful when pneumatic motion platform 10 is used as part of a moving system, e.g. an amusement ride. Two such motive systems, e.g. propulsion drive wheel assemblies, may be mounted front and rear to frame 100 and adapted to power ride vehicle 400 (FIG. 7) around a track, e.g. track 305 (FIG. 13). Controller 112 (not shown in the figures) may be present and adapted to control the motive system, e.g. a programmable controller such as a Compact Logix PLC from Allen Bradley, Corp. of Milwaukee, Wis.

In some systems, power and other connections, e.g. guides, may be present such as rail system 310 (FIG. 13). In such configurations, spring 106 may be present to urge collectors 113 against rail system 310, e.g. as an electrically-powered pinch motor adapted to engage and gain traction upon rail system 310 (FIG. 13), thus enabling guiding amusement ride vehicle 400 through a pre-determined path.

Figure 8:
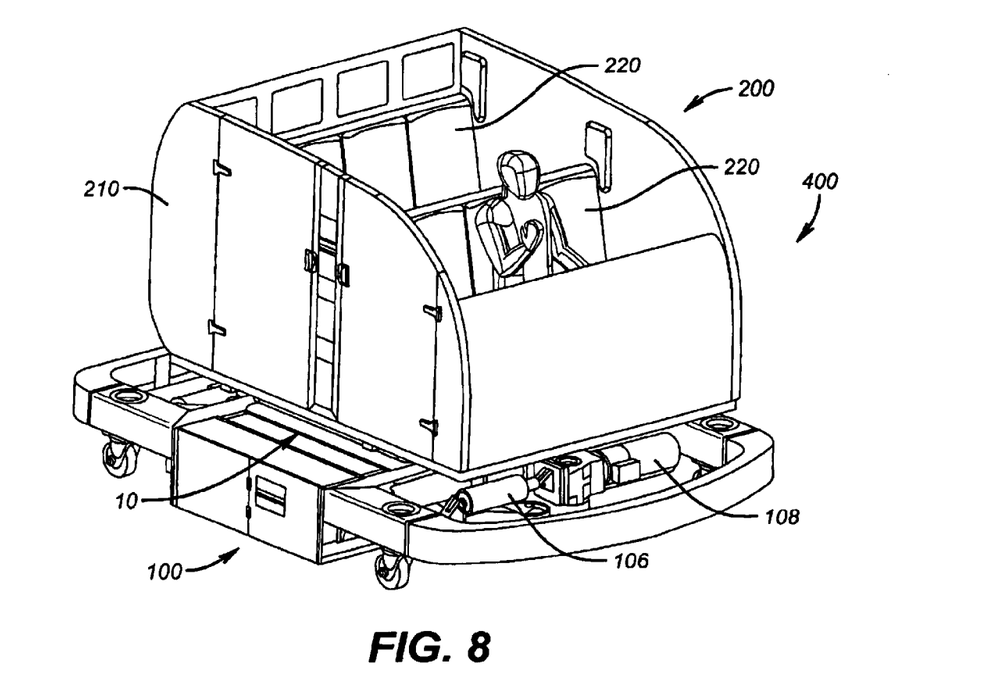
FIG. 8 is a view in partial perspective of an amusement ride vehicle.
Figure 9:
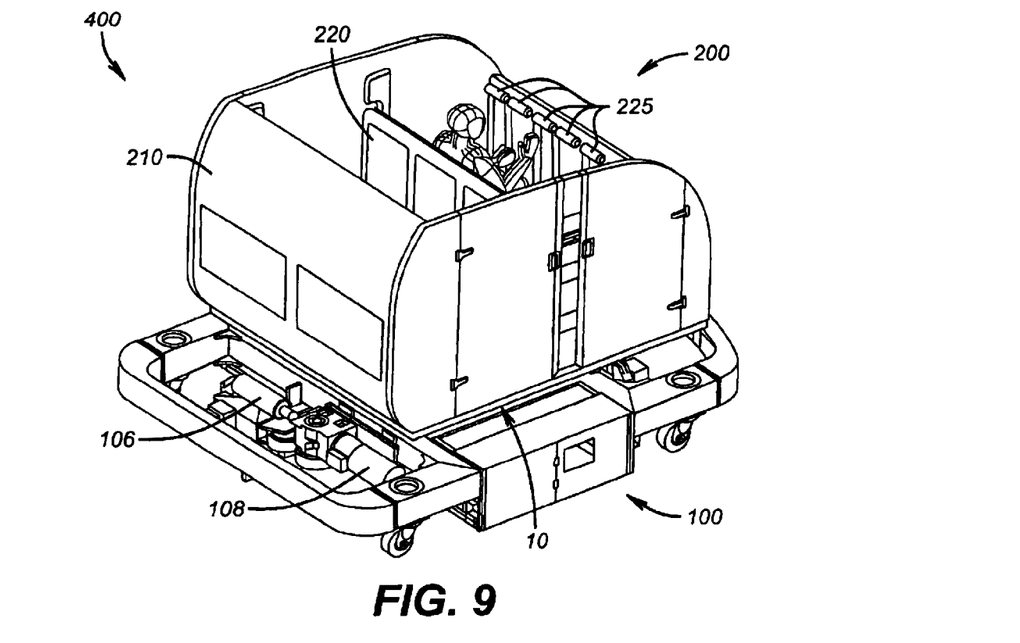
FIG. 9 is a view in partial perspective of an amusement ride vehicle.
Figure 10:
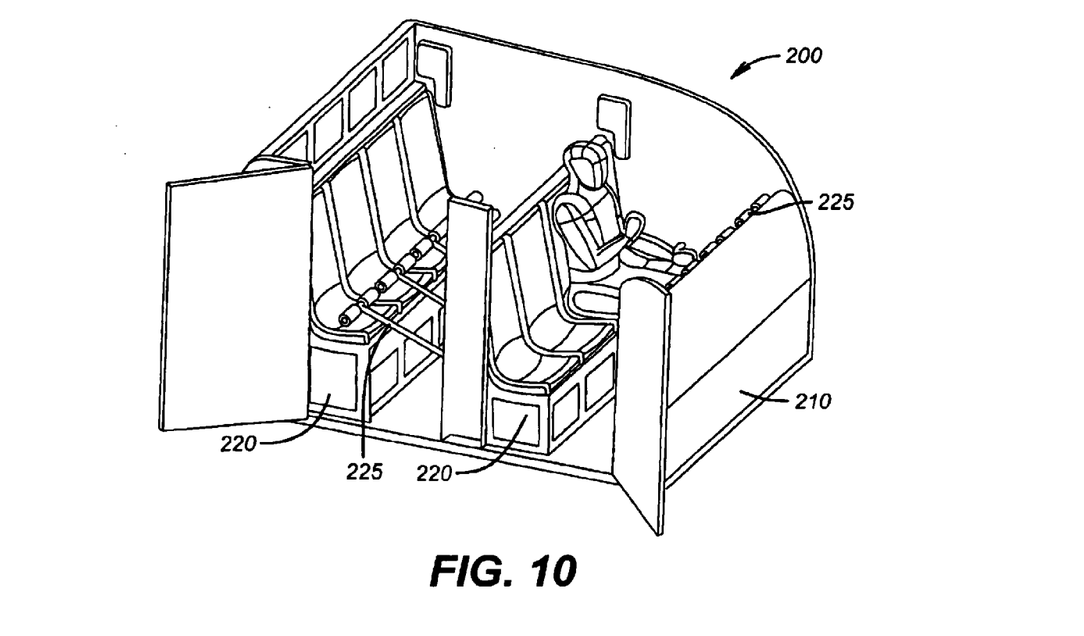
FIG. 10 is a view in partial perspective of an amusement ride vehicle illustrating an interior.

Referring now to FIG. 7 through FIG. 10, amusement ride vehicle 400 may comprise pneumatic motion platform 10 as described above, rotator 50 controllably rotatably mounted to either deck 60 or, as illustrated, frame 100; rotator controller 52 (not shown in the figures) operatively in communication with rotator 50; cabin 200 secured to rotator 50 or, as illustrated, motion platform 10, e.g. via adapters 22; and ride controller 230 (not shown in the figures) operatively in communication with a fluid controller and rotator controller 52. Cabin 200 may be adapted to contain one or more human beings, e.g. through use of seat 220 adapted to hold a human being. Seat 220 may be further adapted to hold a plurality of humans, e.g. two to four humans side by side. Additionally, a plurality of seats 220 may be present, e.g. in rows as illustrated in FIG. 8 and FIG. 10. Cabin 200 may further comprise one or more lap bar restraints 225 (FIG. 9).

As discussed above, in a configuration rotator 50 may be rotatably mounted below pneumatic motion platform 10. In this embodiment, pneumatic motion platform 10 is not connected to frame 100 but, instead, is connected to rotator 50 which is then, in turn, connected to frame 100. Rotator 50 therefore is disposed intermediate frame 100 and pneumatic motion platform 10. Cabin 200 is connected to pneumatic motion platform 10 without rotator 50 being disposed intermediate cabin 200 and pneumatic motion platform base 10.

Inflatable actuators 20 may be pneumatic air-spring actuators as described above, where each pneumatic actuator 20 is independently proportionally controlled to provide programmable control of motion of cabin 200.

On-board vehicle electronics system 240 (not shown in the figures) may be present and operatively in communication with ride controller 230. An onboard audio system (not shown in the figures) may be disposed within or proximate to amusement ride vehicle 400 and may further be adapted to be triggered by the onboard electronics system.

In a typical embodiment, cabin 200 may be around 100 inches long, about 76 inches wide, and about 52 inches high. Cabin 200 may further comprise a rotational envelope of around 132 inches in diameter and a minimum turning radius of around 96 inches.

As is known in the art, exterior dressing 210 may be mounted to, integrated with, or otherwise disposed about cabin 200, defining an exterior for cabin 200.

Referring now to FIGS. 11a, 11b, 12a, and 12b, rotator 50, e.g. turntable assembly 50, provides yaw rotation of cabin 200. In certain embodiments, rotator 50 further comprises a centrally located king-pin bearing assembly 51; an array of rigidly mounted swiveling casters 58 disposed intermediate turntable assembly 52 and deck 60, where casters 58 are operatively coupled with centrally located king-pin bearing assembly 51; electric motor 52 controlled by a variable frequency drive (VFD); and a brake adapted to stop and hold cabin 200 stationary, e.g. limiters 59 (FIG. 6). The configurations illustrated in FIG. 11a and 12a have deck 60 mounted to rotator 50. The configurations illustrated in FIG. 11b and 12b have deck 60 mounted to pneumatic motion platform 10 and pneumatic motion platform 10 further mounted to rotator 50.

The ride controller may further comprise a vehicle control system (not shown in the figures) comprising scene programming for playback as signaled in each scene. The vehicle control system may be adapted to provide critical scene timing, proper vehicle spacing, accurate motion integration, accurate and precise control of propulsion, rotator alignment, angular displacement (pitch/roll) as "scripted," alignment of the cabin with and following of a stereoscopic 3-D image focal point while moving through the show scenes, synchronization of on-board audio with off-board audio and off-board video, full analog control for an actuation system, or the like, or combinations thereof.

Referring now to FIG. 13, amusement ride system 300 may comprise track 305; one or more amusement ride vehicles 400, as described above, adapted to traverse a predetermined portion of track 305; a ride controller (not shown in the figures), operatively in communication with a fluid controller (not shown in the figures) and rotator 50; and station 320 adapted to accept amusement ride vehicle 400 and to allow ingress and egress of human beings into and out from amusement ride vehicle 400. Amusement ride system 300 may further comprise dual transfer serial logic.

Station 320 may be adapted to transit amusement ride vehicle 400 within a predetermined time range, e.g. 1:20–1:25, having a predetermined dispatch interval, e.g. around 18 seconds.

Track 305 may further comprise a ride path divided up into a plurality of zones 307, and each zone 307 may be individually electrically powered, independently controlled, and independently monitored. Zones 307 may be used to maintain proper spacing of amusement ride vehicles 200, e.g. prevent collisions, along with providing a means to accurately synchronize the position of amusement ride vehicles 200 with show elements. A controller may be present to control zones 307 through panels (not shown in the figures), each panel accommodate a predetermined number of zones 307, e.g. ten. This distributed architecture may be utilized to cut down on facility cost associated with long conduit and cable runs, along with providing localized isolation along the track. Each zone 307 may further comprise control rails that are tied back to a ride control system (not shown in the figures). In a preferred embodiment, an emergency stop (ESTOP) rail provides onboard control power for amusement ride vehicle 400 and is normally always ON. However, in the event of an emergency when the ride control system must ensure all motion is stopped on amusement ride vehicle 400, the ride control system can completely shutdown amusement ride vehicle 400 by turning power to this rail OFF. Enable rail may be provided to provides a signal to amusement ride vehicle 400 indicating that amusement ride vehicle 400 is clear to traverse through zone 307. The Ride control system will turn this rail OFF when it requires that amusement ride vehicle 400 hold a position due to track 305 in front of amusement ride vehicle 400 not being clear to proceed. When all is clear, the ride control system will turn ON the Enable rail and amusement ride vehicle 400 will proceed through zone 307.

An input feedback signal may be provided for the Enable and ESTOP rails of each zone 307, e.g. to allow the ride control system to monitor the correct operation, detect any failures and eliminate single point/latent failures.

Present of amusement ride vehicle 400 within zone 307 may be detected, e.g. by the use of a current transducer ("CT") connected to the power feed for each zone 307. Two CT's may be used for each zone 307 to eliminate single point failures.

An infrared ("IR") interlocking system may be provided that will prevent unintended motion proximate station 320. When activated by the ride show controller, the IR interlock will electrically disable all motion-producing elements onboard amusement ride vehicle 400. The ride control system may also receive positive indication by means of a return IR signal that amusement ride vehicle 400 is in fact shut down, e.g. to ensure no motion can occur while guests are traversing on and off amusement ride vehicle 400.

An interface may be provided, e.g. an RF interface, with all amusement ride vehicles 400 to enable real time reporting of status and fault information, e.g. back to at a central location.

Additionally, each amusement ride vehicle 400 may be powered independently of any other amusement ride vehicle 400. Amusement ride vehicle 400 may also be adapted to attain a vehicle speed on track 304 of between zero to six feet per second.

A station area detection system may be used to lock out pneumatic motion platform 10 and rotator 50 while amusement ride vehicle 400 in proximate or at station 320.

Track 305 may further comprise bus rail system 310 adapted to provide electrical power and signal control to operate amusement ride vehicle 400 and a pinch rail system. The pinch rail may be installed directly to a substantially flat steel-reinforced concrete slab.

Bus rail system 310 may further comprise six rails, mounted three per side to a vertical portion of the pinch-rail system. In this configuration, amusement ride vehicle 400 may further comprise two groups of three (electrical) collector arms mounted on a predetermined portion of base 11, where the collector arms are adapted to engage bus rail system 305 from either side of the pinch rail system.

A control system (not shown in the figures) may be present and adapted to provide direct high-speed communication from processor to drives, e,g., a VFD. The control system may be adapted to provide permissive control for each vehicle. The control system may further comprise PLC based control architecture.

Amusement ride system 300 may further comprise ride show system 350 (not shown in the figures) adapted to provide overall coordination and timing for all show elements. In addition to amusement ride vehicles 400, ride show system 350 may comprise audio, lighting, video, special effects, animation, show action equipment, or the like or combinations thereof. Ride show system 350 may be adapted to provide track and time events within each scene, e.g. using an SMPTE generated time code; provide for timing of on-board vehicle audio and off-board scene time-critical components such as video and audio; provide for scene-specific discrete triggers, and monitoring of point input/output, around the attraction and in the "back-of-house" area for complete attraction integration, or the like, or combinations thereof.

Subsystem controller 355 (not shown in the figures) may be present and adapted to provide direct and independent control of a scene special effect, show action equipment, animation, or the like, or a combination thereof. Subsystem controller 355 may be further adapted to integrate with ride show system 350 to allow for seamless interaction of show timing and improved status-checking and diagnostic capabilities. In an embodiment, subsystem controller 355 comprises a discrete model comprising digital inputs and digital outputs, an analog model comprising analog inputs and analog outputs, or a model comprising analog inputs, digital inputs, analog outputs, and digital outputs.

Figure 14:
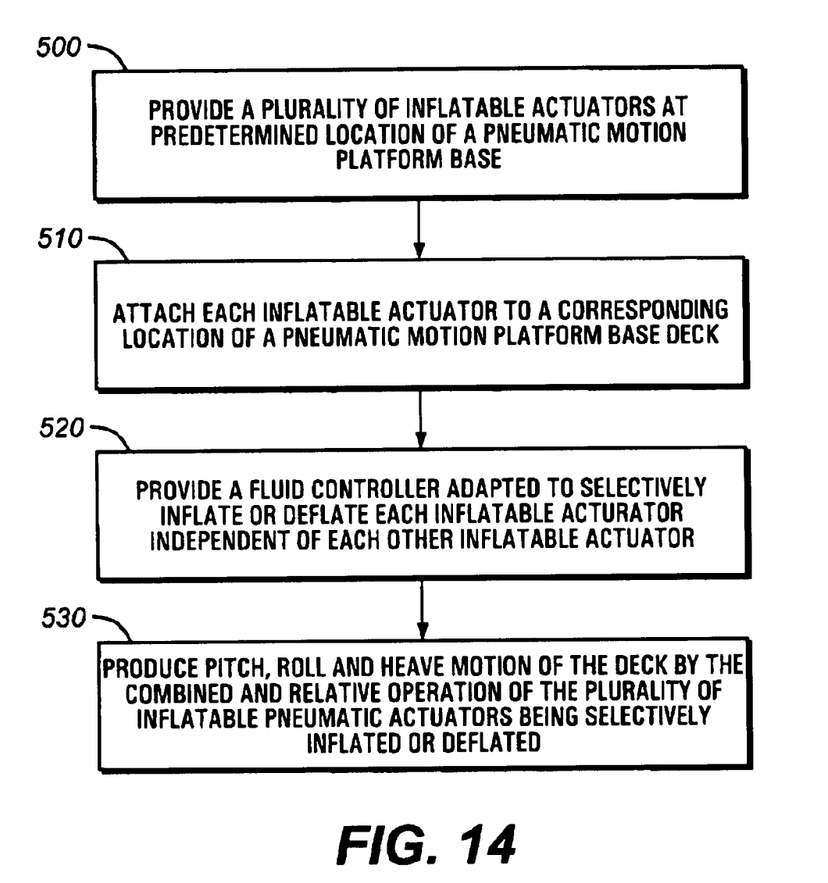
FIG. 14 is a flowchart of an exemplary method.

In the operation of an exemplary embodiment, referring now to FIG. 14, providing independent, simultaneous motion of deck 60 mounted to base 11, both of which are a part of pneumatic motion platform 10 as described herein above, where the motion is in one or more of three axes, may comprise providing a plurality of inflatable actuators 20 at predetermined locations of base 11, step 500; attaching each inflatable actuator 20 to a corresponding location of deck 60, step 510; providing a fluid controller adapted to selectively inflate or deflate each inflatable actuator 20 independent of each other inflatable actuator 20, step 520; and producing pitch, roll, and heave motion of deck 60 by the combined and relative operation of the plurality of inflatable pneumatic actuators 20 being selectively inflated or deflated, step 530.

Additionally, selectively controllable turntable 50 may be provided and operatively connected to deck 60. Yaw may be provided by selectively rotating turntable 50.

An amusement ride system may be provided by providing amusement ride vehicle 400 as described above, where passenger seat 220 is mounted to deck 60 and lap bar 225 disposed proximate passenger seat 220. Station 320 (FIG. 13) may be provided for ingress and egress of people with respect to amusement ride vehicle 400. During guest loading, lap bar 225 may be positioned within a forward wall or a flooring pocket of amusement ride vehicle 400.

Once loaded with people, amusement ride vehicle 400 may be propelled about a track along a predetermined path under the guidance of a programmable controller. Motion of pneumatic motion platform 10 may be actuated under the control of the programmable controller such as by selectively adding or removing a fluid, e,.g. air, from at least one inflatable actuator 20 positioned at a predetermined portion of pneumatic motion platform 10. In a preferred embodiment, a plurality of inflatable actuators 20 are each positioned proximate a separate edge pneumatic motion platform 10 and the combined and relative operation of the plurality of inflatable actuators 20 may be used to produce pitch, roll, and heave motion to amusement ride vehicle 400. Turntable assembly 50 may be used to provide yaw.

It will be understood that various changes in the details, materials, and arrangements of the parts which have been described and illustrated above in order to explain the nature of this invention may be made by those skilled in the art without departing from the principle and scope of the invention as recited in the appended claims.

What is claimed is:

1. A pneumatic motion platform, comprising:
   a. a deck;
   b. a base;
   c. a plurality of inflatable actuators, each actuator attached to at least one of the deck or base at a predetermined location intermediate the base and the deck, the plurality of inflatable actuators adapted for use as an active motive force with respect to the deck in a plurality of planes;
   d. a plurality of compliant stabilizers disposed intermediate the fleck and the base, at least one portion of each stabilizer disposed proximate a predetermined one of the plurality of inflatable actuators;
   e. a fluid controller in fluid communication with the plurality of inflatable actuators; and
   f. a source of fluid in fluid communication with the fluid controller.

2. The pneumatic motion platform of claim 1, wherein the inflatable actuators comprise flexible air spring actuators.

3. The pneumatic motion platform of claim 1, wherein each inflatable actuator further comprises a manifold, the manifold adapted to connect the inflatable actuator to at least one of (a) the deck or (b) the base.

4. The pneumatic motion platform of claim 1, wherein:
   a. the deck is substantially rectilinear; and
   b. one of the plurality of inflatable actuators is disposed proximate each corner of the substantially rectilinear deck.

5. The pneumatic motion platform of claim 1, wherein the fluid controller further comprises:
   a. a fluid conduit; and
   b. a valve disposed intermediate the fluid conduit and the plurality of inflatable actuators, the valve further adapted to operate at least one of (i) electrically, (ii) hydraulically, or (iii) pneumatically.

6. The pneumatic motion platform of claim 1, wherein the compliant stabilizer further comprises a compliant tie rod tensioner adapted to provide lateral retention, a first end of the compliant tie rod tensioner being attached to the base and a second end of the compliant tie rod tensioner being attached to the deck, at least one of the ends being disposed proximate a predetermined one of the plurality of inflatable actuators.

7. The pneumatic motion platform of claim 6, wherein the compliant tension rod is further adapted to take torque and shear loads, allowing the pneumatic actuators to individually impart vertical motion with respect to the deck.

8. The pneumatic motion platform of claim 1, further comprising a rotator adapted to provide rotational movement about a single axis, the rotator rotatably mounted at least one of (a) intermediate the base or the deck wherein rotation of the rotator causes the deck to move independent of the base or (b) either the base or the deck wherein rotation of the rotator causes the base and the deck to move together.

9. The pneumatic motion platform of claim 8, further comprising a bearing disposed intermediate the deck and the rotator.

10. The pneumatic motion platform of claim 9, wherein the bearing comprises a swivel caster.

11. The pneumatic motion platform of claim 8, further comprising a rotator controller adapted to control rotation of the rotator.

12. An amusement ride vehicle, comprising:
a. a frame;
b. a pneumatic motion platform operatively connected to the frame, the pneumatic motion platform comprising:
   i. a deck;
   ii. a base;
   iii. a plurality of inflatable actuators attached to at least one of the deck or the base at predetermined locations intermediate the deck and the base, the plurality of inflatable actuators adapted for use as an active motive force with respect to the deck;
   iv. a plurality of compliant stabilizers disposed intermediate the deck and the base, at least one portion of each compliant stabilizer disposed proximate a predetermined one of the plurality of inflatable actuator; and
   v. a fluid controller in fluid communication with the plurality of inflatable actuators;
c. a source of fluid in fluid communication with the fluid controller;
d. a cabin operatively secured to the pneumatic motion platform, the cabin adapted to contain a human being; and
e. a ride controller, operatively in communication with the fluid controller.

13. The amusement ride vehicle of claim 12, further comprising:
a. a rotator; and
b. a rotator controller operatively in communication with the rotator and the ride controller;
c. wherein the cabin is operatively connected to at least one of (a) the pneumatic motion platform which is operatively connected to the rotator which is operatively connected to the frame, wherein motion of the rotator causes a concurrent movement of the cabin and pneumatic motion platform or (b) the rotator which is operatively connected to the pneumatic motion platform which is operatively connected to the frame, wherein motion of the rotator causes a concurrent movement of the cabin but not the pneumatic motion platform.

14. The amusement ride vehicle of claim 13, further comprising a motive system attached to the frame, the motive system adapted to move the amusement ride vehicle along a predetermined path.

15. The amusement ride vehicle of claim 14, wherein the motive system further comprises an electrically-powered pinch motor adapted to engage and gain traction upon a rail system, thus guiding the amusement ride vehicle through a pre-determined path.

16. The amusement ride vehicle of claim 13, wherein the rotator is a turntable adapted to provide continuous rotation in at least one of (i) a clockwise direction relative to a plane defined by the deck or (ii) a counterclockwise direction relative to the plane.

17. The amusement ride vehicle of claim 16, wherein the turntable provides yaw rotation of the cabin.

18. The amusement ride vehicle of claim 12, wherein the cabin further comprises a seat adapted to hold a human being.

19. The amusement ride vehicle of claim 12, wherein each inflatable actuator further comprises:
a. a pneumatic air-spring actuator independently proportionally controlled to provide programmable control of cabin motion; and
b. a manifold connected to the pneumatic air-spring actuator, the manifold adapted to connect to a further structure.

20. The amusement ride vehicle of claim 12, wherein the compliant stabilizers further comprise compliant tension rods disposed between the base and the deck, the compliant tension rods adapted to take torque and shear loads and allow the inflatable actuators to individually impart vertical motion between cabin and frame.

21. An amusement ride system, comprising:
a. a track;
b. an amusement ride vehicle adapted to traverse a predetermined portion of the track, the amusement ride vehicle further comprising:
   i. a frame;
   ii. a pneumatic motion platform operatively connected to the frame, the pneumatic motion platform comprising:
      (1) a deck;
      (2) a base;
      (3) a plurality of inflatable actuators, attached to at least one of the deck or the base at predetermined locations intermediate the deck and the base, the plurality of inflatable actuators adapted for use as an active motive force with respect to the deck;
      (4) a plurality of compliant stabilizers disposed intermediate the deck and the base, at least one portion of each compliant stabilizer disposed proximate a predetermined one of the plurality of inflatable actuators; and
      (5) a fluid controller in fluid communication with the plurality of inflatable actuators; and
   iii. a source of fluid, operatively in fluid communication with the fluid controller;
   iv. a cabin adapted to contain a human being; and
   v. a rotator adapted to controllably rotate the cabin;
c. a ride controller, operatively in communication with the fluid controller and the rotator; and
d. a station adapted to accept the amusement ride vehicle and to allow ingress and egress of human beings into and out from the amusement ride vehicle.

22. A method of providing, for independent, simultaneous motion of a deck mounted to a base, the motion in three axes, comprising:
a. providing a plurality of inflatable actuators at predetermined locations of a base;
b. attaching each inflatable actuator to a corresponding location a deck;
c. providing a fluid controller adapted to selectively inflate or deflate each inflatable actuator independent of each other inflatable actuator; and
d. producing pitch, roll, and heave motion of the deck by the combined and relative operation of the plurality of inflatable pneumatic actuators being selectively inflated or deflated.

23. A method of providing for independent, simultaneous motion of a deck mounted to a base of claim 22, further comprising:
a. providing a selectively controllable turntable to the deck; and
b. selectively rotating the turntable to provide yaw.

24. A method of providing an amusement ride system, comprising:
a. providing an amusement ride vehicle, the amusement ride vehicle comprising:
   i. a deck;
   ii. a passenger seat mounted to the deck;
   iii. a lap bar disposed proximate the passenger seat;

iv. a turntable mounted to the deck on a side of the deck opposite a side of the deck on which the passenger seat is mounted;
v. a multiple degree of freedom pneumatic motion base mounted to the turntable;

b. providing a station for ingress and egress of people into and out from the amusement ride vehicle;

c. during guest loading, positioning the lap bar within at least one of (i) a forward wall of the amusement ride vehicle or (ii) a flooring pocket of the amusement ride vehicle;

d. propelling the amusement ride vehicle about a track along a predetermined path under the guidance of a programmable controller; and e. actuating the motion base under the control of the programmable controller by selectively adding or removing a fluid from at least one inflatable pneumatic actuator positioned at a predetermined portion of the motion base.

25. The method of claim 24, wherein:

a. the inflatable pneumatic actuator is a plurality of inflatable pneumatic actuators, each positioned proximate a separate edge of the motion base;

b. wherein combined and relative operation of the plurality of inflatable pneumatic actuators produces pitch, roll, and heave motion to the amusement ride vehicle and the turntable device provides yaw.

* * * * *

UNITED STATES PATENT AND TRADEMARK OFFICE
CERTIFICATE OF CORRECTION

| | |
|---|---|
| PATENT NO. | : 7,094,157 B2 |
| APPLICATION NO. | : 10/781126 |
| DATED | : August 22, 2006 |
| INVENTOR(S) | : Stephen F. Fromyer et al. |

It is certified that error appears in the above-identified patent and that said Letters Patent is hereby corrected as shown below:

Col. 8, line16 replace "fleck" with --deck--.

Col. 8, line 28 replace "of(a)" with --of (a)--.

Col. 10, line 40 replace "A method of providing, for independent" with --A method of providing for independent--.

Col. 10, line 46 replace "location a deck" with --location of a deck--.

Signed and Sealed this

Thirty-first Day of October, 2006

JON W. DUDAS
*Director of the United States Patent and Trademark Office*